United States Patent
Chen

(10) Patent No.: US 10,831,432 B2
(45) Date of Patent: *Nov. 10, 2020

(54) MULTI-PICTURE DISPLAY METHOD, AND DISPLAY DEVICE

(71) Applicants: HKC Corporation Limited, Guangdong (CN); Chongqing HKC Optoelectronics Technology Co., Ltd., Chongqing (CN)

(72) Inventor: Yu-Jen Chen, Chongqing (CN)

(73) Assignees: HKC Corporation Limited, Guangdong (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/310,105

(22) PCT Filed: Dec. 29, 2017

(86) PCT No.: PCT/CN2017/120050
§ 371 (c)(1),
(2) Date: Dec. 14, 2018

(87) PCT Pub. No.: WO2018/121763
PCT Pub. Date: Jul. 5, 2018

(65) Prior Publication Data
US 2019/0333474 A1   Oct. 31, 2019

(30) Foreign Application Priority Data
Dec. 30, 2016 (CN) .......................... 2016 1 1265522

(51) Int. Cl.
*G09G 5/00* (2006.01)
*G06F 3/14* (2006.01)
(Continued)

(52) U.S. Cl.
CPC .......... *G06F 3/1446* (2013.01); *G06F 1/1652* (2013.01); *G06F 3/033* (2013.01);
(Continued)

(58) Field of Classification Search
CPC ........ G06F 3/16; G06F 3/165; G06F 3/04886; G06F 3/1446; G06F 3/0482
See application file for complete search history.

(56) References Cited

U.S. PATENT DOCUMENTS 9,098,240 B2    8/2015   Kim et al.
9,122,319 B2 *  9/2015   Kwak .................. G06F 3/0487
(Continued)

FOREIGN PATENT DOCUMENTS

CN    104615393 A    5/2015
CN    105204800 A    12/2015
(Continued)

OTHER PUBLICATIONS

International Search Report for Application No. PCT/CN2017/120050 dated Apr. 4, 2018, 2 pages.

*Primary Examiner* — Vijay Shankar
(74) *Attorney, Agent, or Firm* — Seyfarth Shaw LLP; Joseph Lanser

(57) ABSTRACT

A split-screen display method and a display apparatus are disclosed. The method is applicable to a display apparatus including a curved display screen, and includes: obtaining position information of a preset fold line on a curved display screen in response to detecting that an user bends and splits the curved display screen according to the preset fold line and a display screen corresponding to the preset fold line is recessed relative to a rear side of the curved display screen, wherein the preset fold line is a dividing line between adjacent curved display screens formed by the bending and splitting; dividing a display interface of the curved display
(Continued)

screen into a plurality of sub-interfaces according to the position information, and a splitting line between the two adjacent sub-interfaces coincides with the preset fold line; obtaining display content selected by the user in the sub-interfaces; and displaying the display content via the sub-interfaces.

20 Claims, 6 Drawing Sheets

(51) Int. Cl.
<table>
<tr><td>H04N 21/41</td><td>(2011.01)</td></tr>
<tr><td>H04N 21/43</td><td>(2011.01)</td></tr>
<tr><td>G06F 3/16</td><td>(2006.01)</td></tr>
<tr><td>G06F 1/16</td><td>(2006.01)</td></tr>
<tr><td>G06F 3/033</td><td>(2013.01)</td></tr>
<tr><td>G06F 3/0482</td><td>(2013.01)</td></tr>
<tr><td>G06F 3/0488</td><td>(2013.01)</td></tr>
<tr><td>G09F 9/30</td><td>(2006.01)</td></tr>
<tr><td>G09F 9/302</td><td>(2006.01)</td></tr>
<tr><td>G09G 5/14</td><td>(2006.01)</td></tr>
<tr><td>H04N 21/431</td><td>(2011.01)</td></tr>
</table>

(52) U.S. Cl.
CPC ........ *G06F 3/0482* (2013.01); *G06F 3/04886* (2013.01); *G06F 3/16* (2013.01); *G06F 3/165* (2013.01); *G09F 9/301* (2013.01); *G09F 9/3023* (2013.01); *G09F 9/3026* (2013.01); *G09G 5/006* (2013.01); *G09G 5/14* (2013.01); *H04N 21/4122* (2013.01); *H04N 21/431* (2013.01); *H04N 21/4307* (2013.01); *G06F 2203/04803* (2013.01); *G09G 2320/0261* (2013.01); *G09G 2340/14* (2013.01); *G09G 2354/00* (2013.01); *G09G 2360/04* (2013.01); *G09G 2380/02* (2013.01)

(56) References Cited

U.S. PATENT DOCUMENTS

<table>
<tr><td>9,349,342</td><td>B2</td><td>5/2016</td><td>Zhang et al.</td></tr>
<tr><td>9,383,776</td><td>B2</td><td>7/2016</td><td>Choi</td></tr>
<tr><td>9,639,175</td><td>B2 *</td><td>5/2017</td><td>Cho .................. G06F 1/1652</td></tr>
<tr><td>9,959,030</td><td>B2 *</td><td>5/2018</td><td>Sang ................ G06F 3/04817</td></tr>
<tr><td>10,380,976</td><td>B2 *</td><td>8/2019</td><td>Chen ................ H04N 21/4122</td></tr>
<tr><td>2013/0229324</td><td>A1</td><td>9/2013</td><td>Zhang et al.</td></tr>
<tr><td>2014/0049464</td><td>A1*</td><td>2/2014</td><td>Kwak .................. G06F 3/0487<br>345/156</td></tr>
<tr><td>2015/0009125</td><td>A1</td><td>1/2015</td><td>Kim et al.</td></tr>
<tr><td>2016/0259514</td><td>A1</td><td>9/2016</td><td>Sang et al.</td></tr>
</table>

FOREIGN PATENT DOCUMENTS

<table>
<tr><td>CN</td><td>105938426 A</td><td>9/2016</td></tr>
<tr><td>CN</td><td>106686423 A</td><td>5/2017</td></tr>
</table>

* cited by examiner

MULTI-PICTURE DISPLAY METHOD, AND DISPLAY DEVICE

CROSS REFERENCE TO RELATED APPLICATIONS

This is a National Stage application of, and claims priority to, PCT/CN2017/120050, filed Dec. 29, 2017, which claims priority to Chinese Patent Application No. 201611265522.X, filed Dec. 30, 2016, the disclosures of which are incorporated herein by reference in their entirety.

TECHNICAL FIELD

The present disclosure relates to a field of display technology, and particularly relates to a split-screen display method and a display apparatus.

BACKGROUND

Currently, more and more liquid crystal panels need to use curved display screens, and the curved display screens also bring different experiences to consumers, making the curved display screens gradually become a new development direction in the industry, among which the flexible curved display screen (with an arbitrarily variable curvature) is favored by users. But according to the conventional curved display screen, multi-users may only view the same content at the same time. The conventional divi-screen display technology or picture by picture (PBP) technology can realize multi-users viewing different content at the same time, but since the curved display screen will cause the content to interfere with each other, it does not have a better visual experience.

SUMMARY

Embodiments of the present disclosure provide a split-screen display method and a display apparatus, which realize that different users can view content by using a same display screen, with no interference.

A split-screen display method, applicable to a display apparatus including a curved display screen is provided, including:

obtaining position information of a preset fold line on the curved display screen in response to detecting that a user bends and splits the curved display screen according to the preset fold line and a display screen corresponding to the preset fold line is recessed relative to a rear side of the curved display screen, wherein the preset fold line is a dividing line between adjacent curved display screens formed by the bending and splitting.

dividing a display interface of the curved display screen into a plurality of sub-interfaces according to the position information, wherein a splitting line between two adjacent sub-interfaces coincides with the preset fold line;

obtaining display content selected by the user in the sub-interfaces; and displaying the display content selected in the sub-interfaces via the sub-interfaces.

In the split-screen display method according to the present disclosure, prior to obtaining the position information of the preset fold line on the curved display screen, the method further includes: determining whether a split-screen function of the curved display screen is selected; and obtaining position information of the preset fold on the curved display screen if the split-screen function of the curved display screen is selected.

In the split-screen display method according to the present disclosure, after obtaining the display content selected by the user in the sub-interfaces, the method further includes: determining whether audio information exists in the display content; selecting an audio channel from a plurality of audio channels used by the curved display screen if the audio information exists in the display content; and outputting the audio information through the selected audio channel.

In the split-screen display method according to the present disclosure, when the user bends and splits the curved display screen according to the preset fold line and a display screen corresponding to the preset fold line is recessed relative to a rear side of the curved display screen, a display screen corresponding to the preset fold line is configured to block the display content of the sub-interfaces on both sides of the splitting line.

In the split-screen display method according to the present disclosure, the preset fold line is a vertical fold line; the obtaining the position information of the preset fold line on the curved display screen specifically includes: obtaining corresponding column pixel units of the vertical fold line on the curved display screen.

A display apparatus, including:

a first obtaining module, configured to obtain position information of a preset line on a curved display screen in response to detecting that a user bends and splits the curved display screen according to a preset fold line and a display screen corresponding to the preset fold line is recessed relative to a rear side of the curved display screen, wherein the preset fold line is a dividing line between adjacent curved display screens formed by the bending and splitting;

a dividing module, configured to divide a display interface of the curved display screen into a plurality of sub-interfaces according to the position information, wherein a splitting line between two adjacent sub-interfaces coincides with the preset fold line;

a second obtaining module, configured to obtain display content selected by the user in the sub-interfaces; and a displaying module, configured to display the display content selected in the sub-interfaces via the sub-interfaces.

In the display apparatus according to the present disclosure, the display apparatus further includes a first determining module. The first determining module is configured to determine whether a split-screen function of the curved display screen is selected. If the split-screen function of the curved display screen is selected, the first obtaining module is configured to obtain position information of the preset fold on the curved display screen.

In the display apparatus according to the present disclosure, the display apparatus further includes: a second determining module configured to determine whether audio information exists in the display content; a selecting module, configured to select an audio channel is from a plurality of audio channels used by the curved display screen in response to determining that the audio information exists in the display content; and an outputting module, configured to output the audio information through the selected audio channel.

In the display apparatus according to the present disclosure, when the user bends and splits the curved display screen according to the preset fold line and a display screen corresponding to the preset fold line is recessed relative to a rear side of the curved display screen, the display screen corresponding to the preset fold line is configured to block the display content of the sub-interfaces on both sides of the splitting line.

In the display apparatus according to the present disclosure, the preset fold line is a vertical fold line; the first obtaining module is specifically configured to obtain corresponding column pixel units of the vertical fold line on the curved display screen.

In the embodiments according to present disclosure, the curved display screen is physically bent by the user along the preset fold line, and by a software the curved display screen is divided into a plurality of sub-interfaces according to a display interface splitting manner corresponding to the physical bending manner, such that different sub-interfaces display different content, thereby enabling multiple users to view different screen content simultaneously.

BRIEF DESCRIPTION OF THE DRAWINGS

To illustrate the technical solutions according to the embodiments of the present disclosure, the accompanying drawings for describing the embodiments are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The technical solutions of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

Figure 1:
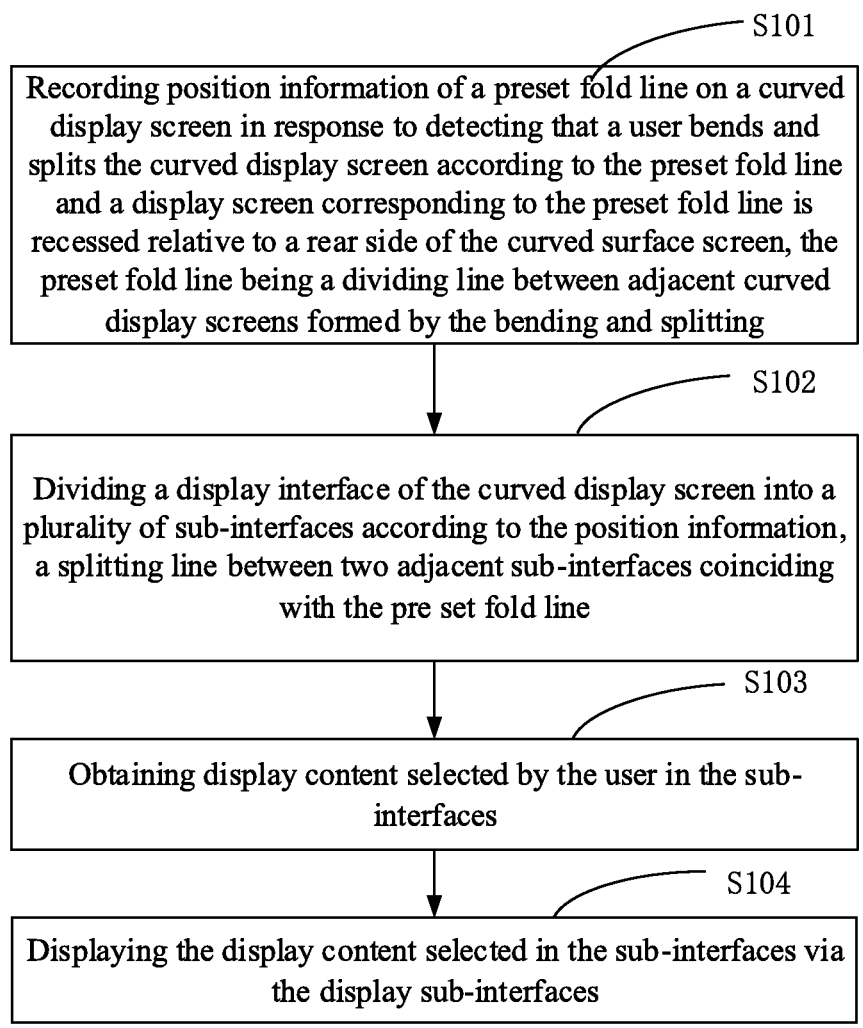
FIG. 1 is a flow chart of a split-screen display method according to an embodiment of the present disclosure.

Referring to FIG. 1, FIG. 1 is a flow chart of a split-screen display method according to an embodiment of the present disclosure. The split-screen display method is applicable to a display apparatus, and the display apparatus includes a curved display screen. The curved display screen can be bent into a plurality of curved display screens by an external force. As shown in FIG. 1, the split-screen display method includes steps S101 to S104.

At S101, position information of a preset line on a curved display screen is obtained in response to detecting that a user bends and splits the curved display screen according to a preset fold line and a display screen corresponding to the preset fold line is recessed relative to a rear side of the curved display screen, the preset fold line is a dividing line between adjacent curved display screens formed by the bending and splitting.

Figure 2:
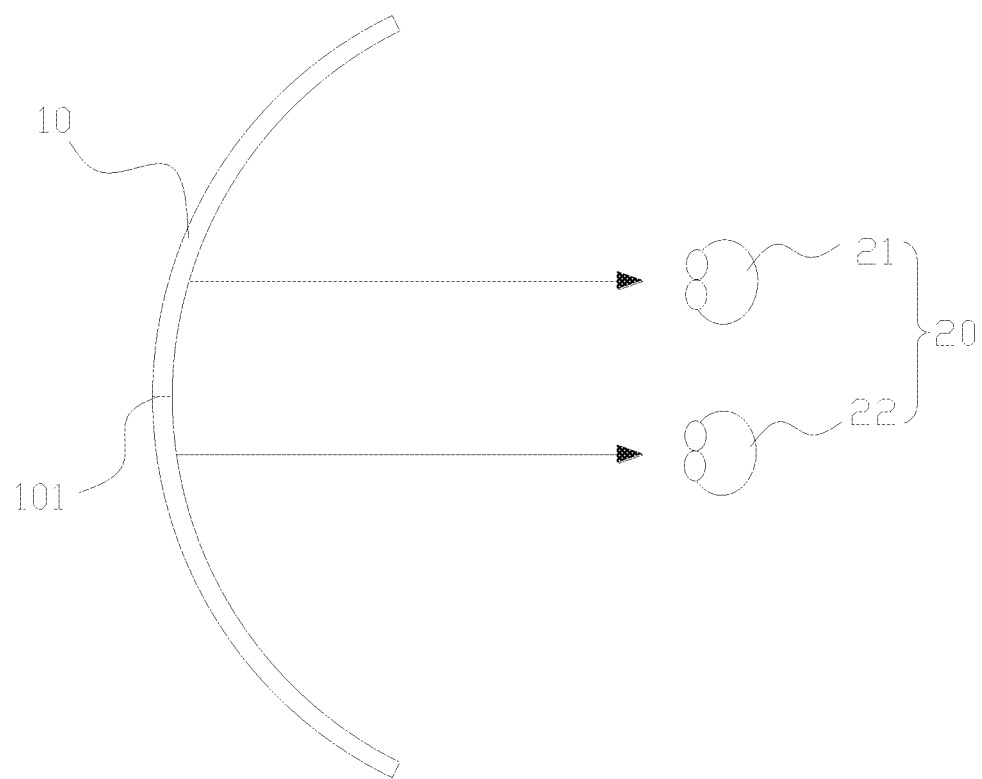
FIG. 2 is a schematic view of a user viewing a curved display screen according to an embodiment of the present disclosure.
Figure 3:
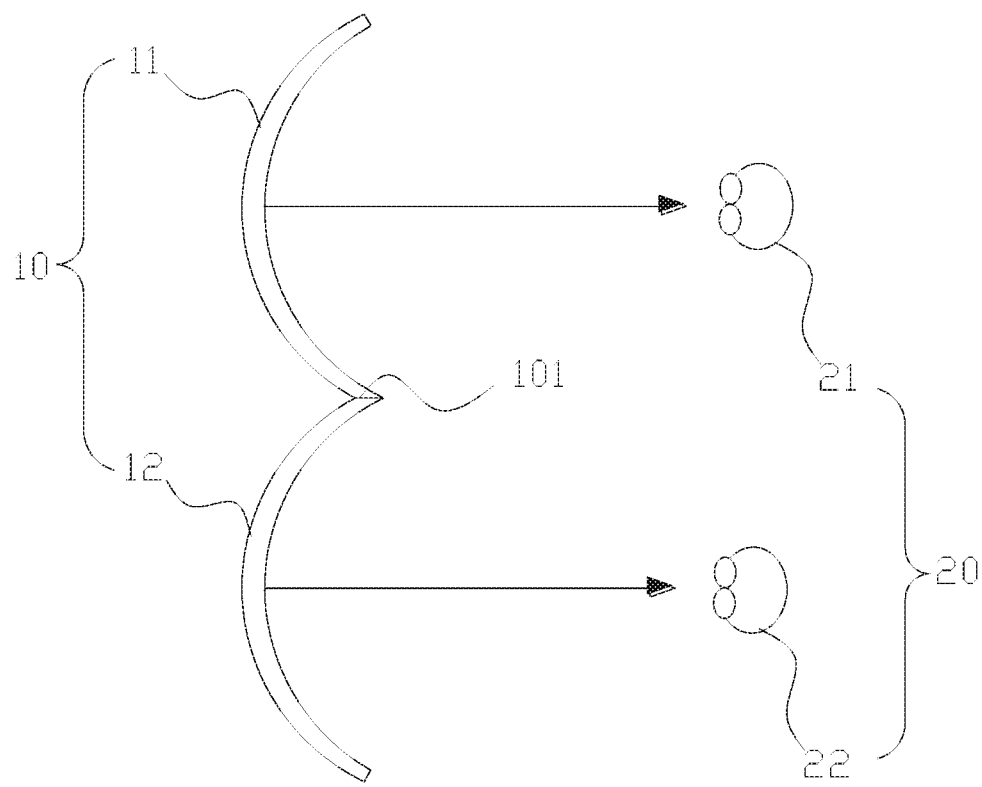
FIG. 3 is a schematic view of an effect of users viewing a curved display screen with a split-screen display method according to an embodiment of the present disclosure.
Figure 4:
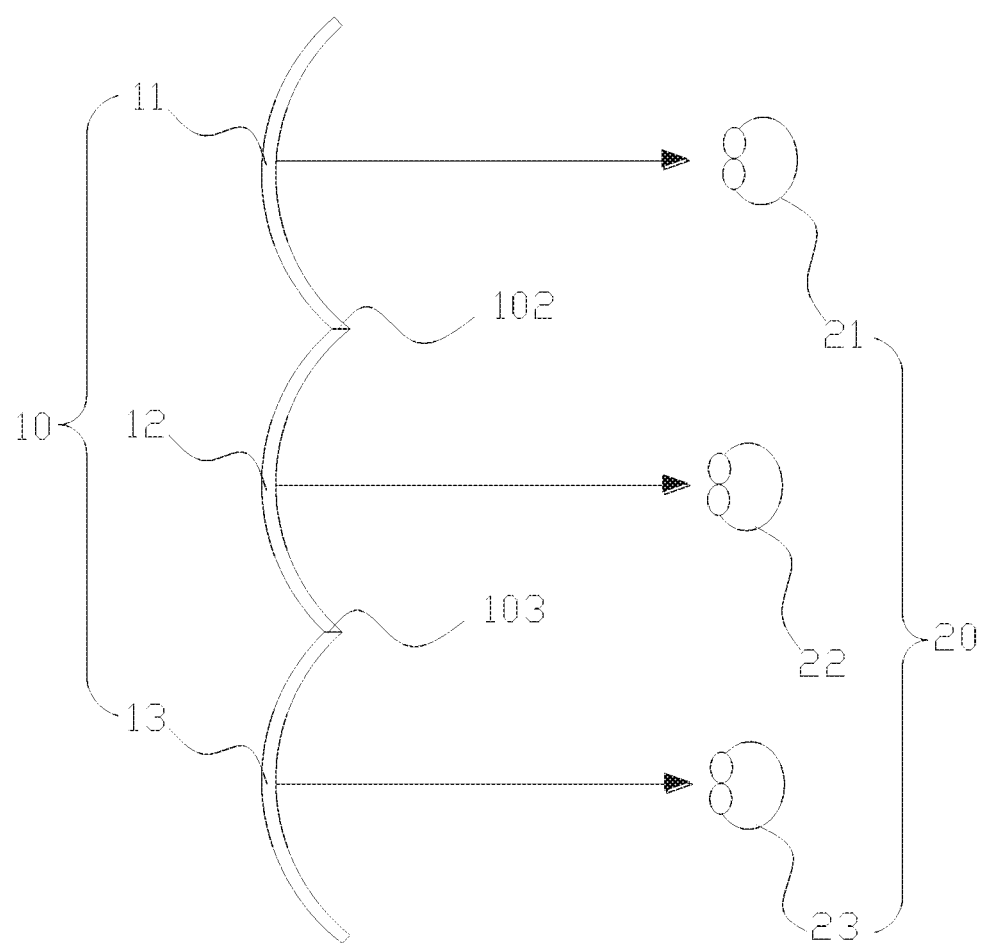
FIG. 4 is a schematic view of an effect of users viewing a curved display screen with a split-screen display method according to an embodiment of the present disclosure.

In the embodiments according to the present disclosure, when a plurality of users are viewing picture content on the curved display screen, if the users want to view different picture content simultaneously on the curved display screen, the curved display screen can be bent into at least two curved display screen according to the preset fold line by the external force, and the preset fold line is the dividing line between adjacent curved display screens formed by the bending and splitting. Specifically, referring to FIG. 2 and FIG. 3, FIG. 2 is a schematic view of a user viewing a curved display screen according to an embodiment of the present disclosure, and FIG. 3 is a schematic view of an effect of users viewing a curved display screen with a split-screen display method according to an embodiment of the present disclosure. As shown in FIG. 2, the curved display screen 10 is provided with a preset fold line 101, and the preset fold line 101 can be plural. When a plurality of users (such as a user 21 and a user 22) are viewing programs using the curved display screen 10, if the user 21 and user 22 want to view different programs simultaneously using the curved display screen 10, the curved display screen 10 can be bent and split according to the preset fold line 101, the preset fold line 101 can split two curved display screens. As shown in FIG. 3, the curved display screen 10 is bent into a first curved display screen 11 and a second curved display screen 12 according to the preset fold line 101. When the preset fold line is plural, the curved display screen can be split into a plurality of curved display screens, such as a second preset fold line 102 and a third preset fold line 103 in FIG. 4, the curved display screen 10 can be split into the first curved display screen 11, the second curved display screen 12, and a third curved display screen 13 according to the second preset fold line 102 and the third preset fold line 103.

When it is detected that an user bends and splits the curved display screen according to the preset fold line and a display screen corresponding to the preset fold line is recessed relative to the rear side of the curved display screen, specifically a sensor can be used to perform the detection. For example, a pressure sensor may be set at the preset fold line, and when the pressure value detected by the pressure sensor reaches a certain preset pressure threshold range, it is determined that the user is bending and splitting the curved display screen according to the preset fold line, and the display screen corresponding to the preset fold line is recessed relative to the rear side of the curved display screen. At this time, position information of the preset fold line on the curved display screen is obtained. Specifically, the preset fold line includes but is not limited to a vertical fold line. If the fold line is the vertical fold line, then corresponding column pixel units of the vertical fold line on the curved display screen is obtained, and the column pixel units can be used as the position information of the vertical fold line on the curved display screen. Further, the position information of the preset fold line on the curved display screen can also be determined by other manners.

At S102, a display interface of the curved display screen is divided into a plurality of sub-interfaces according to the position information, and a splitting line between two adjacent sub-interfaces coincides with the preset fold line.

In the embodiments according to the present disclosure, when the display interface of the curved display screen is divided into a plurality of sub-interfaces according to the position information. Specifically, the display interface of the curved display screen 10 is divided into a sub-interface of the first curved display screen 11 and a sub-interface of the second curved display screen 12, the two sub-interfaces are independent, they can be shrunken versions of the display interface of the original curved display screen 10, or be new display interfaces. The most important is that the splitting line between the two sub-interfaces coincides with the preset fold line, and the position of the splitting line is depended on the preset fold line on the curved display screen. Thus, according to the physical splitting of the curved display screen (the hardware is bent into a plurality of display screens), the splitting display of the display interface is correspondingly realized on the software.

At S103, display content selected by the user in the sub-interfaces is obtained.

In the embodiments according to the present disclosure, the display content selected by the user in the sub-interfaces is obtained. Specifically, if the user 21 and user 22 want to view different picture content simultaneously, after the aforementioned steps, the users can select different content of video or text in the sub-interface of the first curved display screen 11 and the sub-interface of the second curved display screen 12. For example, the user 21 selects a video A in the sub-interface of the first curved display screen 11 and the user 22 selects a video B in the sub-interface of the second curved display screen 12, then the display content selected by the users is obtained, i.e., the video A and the video B.

At S104, the display content selected in the sub-interfaces is displayed via the sub-interfaces.

In the embodiments according to the present disclosure, for example, the user 21 selects the video A in the sub-interface of the first curved display screen 11, then the video A is displayed via the sub-interface of the first curved display screen 11. The user 22 selects the video B in the sub-interface of the second curved display screen 12, then the video B is displayed via the sub-interface of the second curved display screen 12. In this way, different users can view different display contents through different screens corresponding to the curved display screen and the display interface. When the display screen corresponding to the preset fold line is bent, it protrudes from the curved display screen, thus the preset fold line can also cover the display content of the sub-interfaces on both sides of the splitting line, such that the users can truly enjoy the effect of two display screens. Unlike the conventional splitting screen technology, it is realized that different users can view different content by using a same display screen, with no interference.

Figure 5:
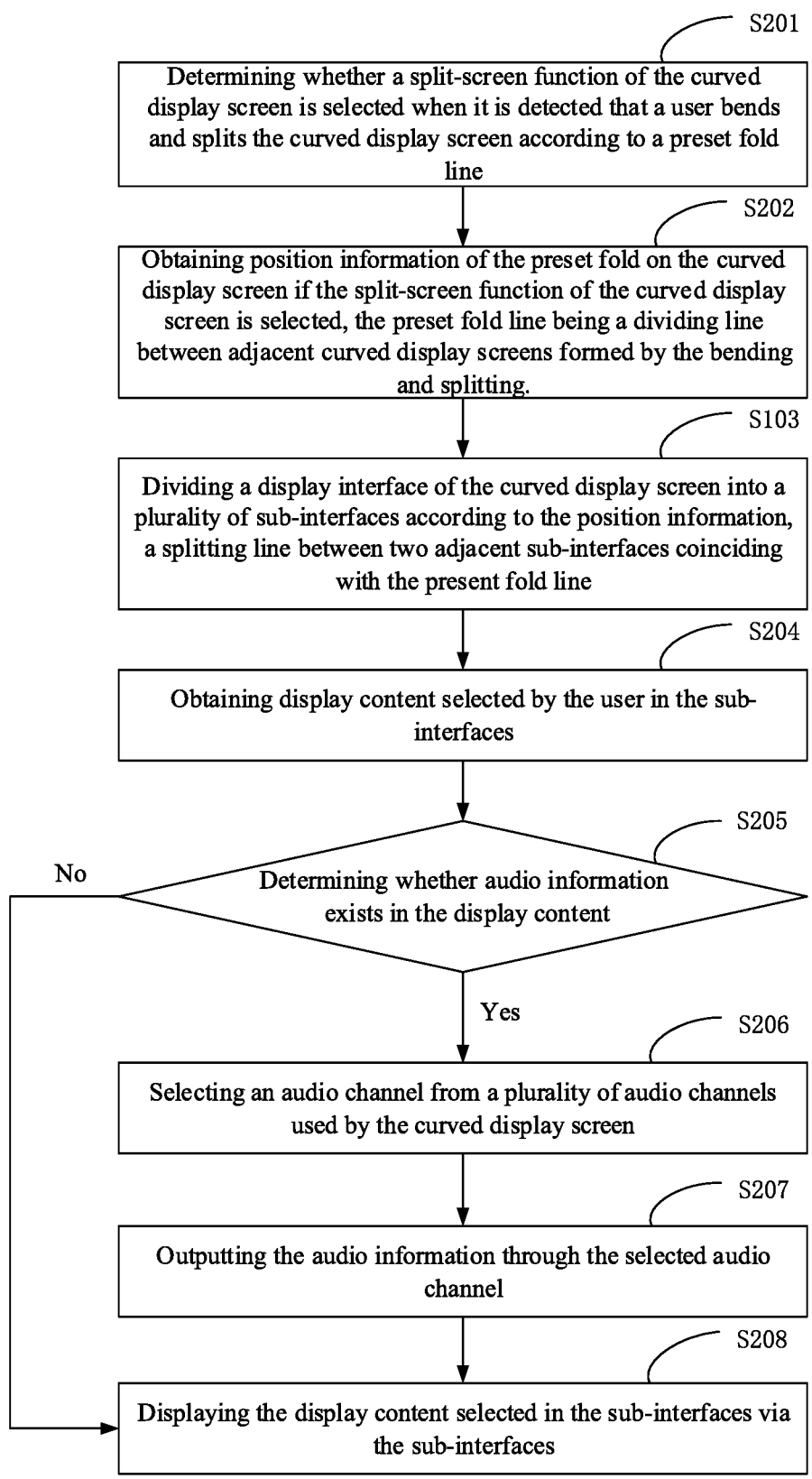
FIG. 5 is another flow chart of a split-screen display method according to an embodiment of the present disclosure.

Referring to FIG. 5, FIG. 5 is a flow chart of a split-screen display method according to an embodiment of the present disclosure. The split-screen display method is applicable to a display apparatus, and the display apparatus includes a curved display screen. The curved display screen can be bent into a plurality of curved display screens by an external force. The curved display screen is provided with a plurality of audio channels, or the host corresponding to the curved display screen is provided with a plurality of audio channels. As shown in FIG. 5, the split-screen display method includes steps S201 to S206.

At S201, it is determined whether a split-screen function of the curved display screen is selected when it is detected that a user bends and splits the curved display screen according to a preset fold line, and a display screen corresponding to the preset fold line is recessed relative to the rear side of the curved display screen.

In the embodiments according to the present disclosure, the split-screen function can corresponds to a mode of split screen button. The split screen button is defined on the curved display screen. After the user bents and splits the curved display screen along the preset fold line and the curved display screen is folding towards the preset fold line, the user is prompted to select the split-screen function. For example, the split-screen function of the curved display screen can be selected by pressing the split screen button. It is determined whether the split-screen function of the curved display screen is selected, if the split-screen function of the curved display screen is selected, then the step S202 is performed. If the split-screen function of the curved display screen is not selected, then prompt information for prompting the user to select the split-screen function of the curved display screen is output.

At S202, if the split-screen function of the curved display screen is selected, position information of the preset fold on the curved display screen is obtained. The preset fold line is the dividing line between adjacent curved display screens formed by the bending and splitting.

In the embodiments according to the present disclosure, during obtaining the position information of the preset fold line on the curved display screen. Specifically, the preset fold line includes but is not limited to a vertical fold line. If the fold line is the vertical fold line, then the corresponding column pixel units of the vertical fold line on the curved display screen is obtained, and the column pixel units can be used as the position information of the vertical fold line on the curved display screen. Further, the position information of the preset fold line on the curved display screen can also be determined by other manners.

At S203, a display interface of the curved display screen is divided into a plurality of sub-interfaces according to the position information. A splitting line between the two adjacent sub-interfaces coincides with the preset fold line.

In the embodiments according to the present disclosure, when the display interface of the curved display screen is divided into a plurality of sub-interfaces according to the position information. Referring to FIG. 2, specifically, the display interface of the curved display screen 10 is divided into a sub-interface of the first curved display screen 11 and a sub-interface of the second curved display screen 12, and the two sub-interfaces can be shrunken versions of the display interface of the original curved display screen 10, or be new display interfaces. The most important is that the splitting line between the two sub-interfaces coincides with the preset fold line, and the position of the splitting line is depended on the preset fold line on the curved display screen. Thus, according to the physical splitting of the curved display screen (the hardware is bent into a plurality of display screens), the splitting display of the display interface is correspondingly realized on the software.

At S204, display content selected by the user in the sub-interfaces is obtained.

In the embodiments according to the present disclosure, the display content selected by the user in the sub-interfaces is obtained. Specifically, if the user 21 and user 22 want to view different picture content simultaneously, after the aforementioned steps, the users can select different content of video or text in the sub-interface of the first curved display screen 11 and the sub-interface of the second curved display screen 12. For example, the user 21 selects a video A in the sub-interface of the first curved display screen 11 and the user 22 selects a video B in the sub-interface of the second curved display screen 12, then the display content (i.e., the video A and the video B) selected by the users is obtained.

At S205, it is determined whether audio information exists in the display content.

In the embodiments according to the present disclosure, whether the audio information exists in the display content is determined. For example, the display content is video A and video B, then the video A and video B may have audio information. To determine whether the audio information exists, an existing method of audio information detection is employed, and it will not be described in detail herein. If the display content has audio information, then the step S206 is performed. If the display content has no audio information, then the step S208 is performed.

At S206, if the audio information exists in the display content, an audio channel is selected from a plurality of audio channels used by the curved display screen.

In the embodiments according to the present disclosure, the curved display screen uses a plurality of audio channels, and the audio channels are independent audio channels, which can transmit different audio information separately and simultaneously. The different audio channels correspond to different audio devices, such as earphone interfaces and speakers. The earphone interfaces and the speakers may correspond to multiple audio channels, and a plurality of earphone interfaces and speakers are respectively connected to different audio channels.

At S207, the audio information is output through the selected audio channel.

In the embodiments according to the present disclosure, the selected audio channel is an audio channel selected for a different split screen. The audio information of the selected display content in the split screen is output through the audio channel corresponding to the split screen, therefore different display content can be viewed through different sub-interfaces of the curved display screen, and the users can only listen to the audio information of the respective display content, thereby preventing mutual interference, and improving the visual and aural experience during viewing.

At S208, the display content selected in the sub-interfaces is displayed via the sub-interfaces.

In the embodiments according to the present disclosure, for example, the user 21 selects the video A in the sub-interface of the first curved display screen 11, then the video A is displayed via the sub-interface of the first curved display screen 11. The user 22 selects the video B in the sub-interface of the second curved display screen 12, then the video B is displayed via the sub-interface of the second curved display screen 12.

In the aforementioned embodiments according to present disclosure, the curved display screen is physically bent by the user along the preset fold line, and by a software the curved display screen is divided into a plurality of sub-interfaces according to a display interface splitting manner corresponding to the physical bending manner, such that different sub-interfaces display different content, thereby enabling multiple users to view different screen content simultaneously.

Figure 6:
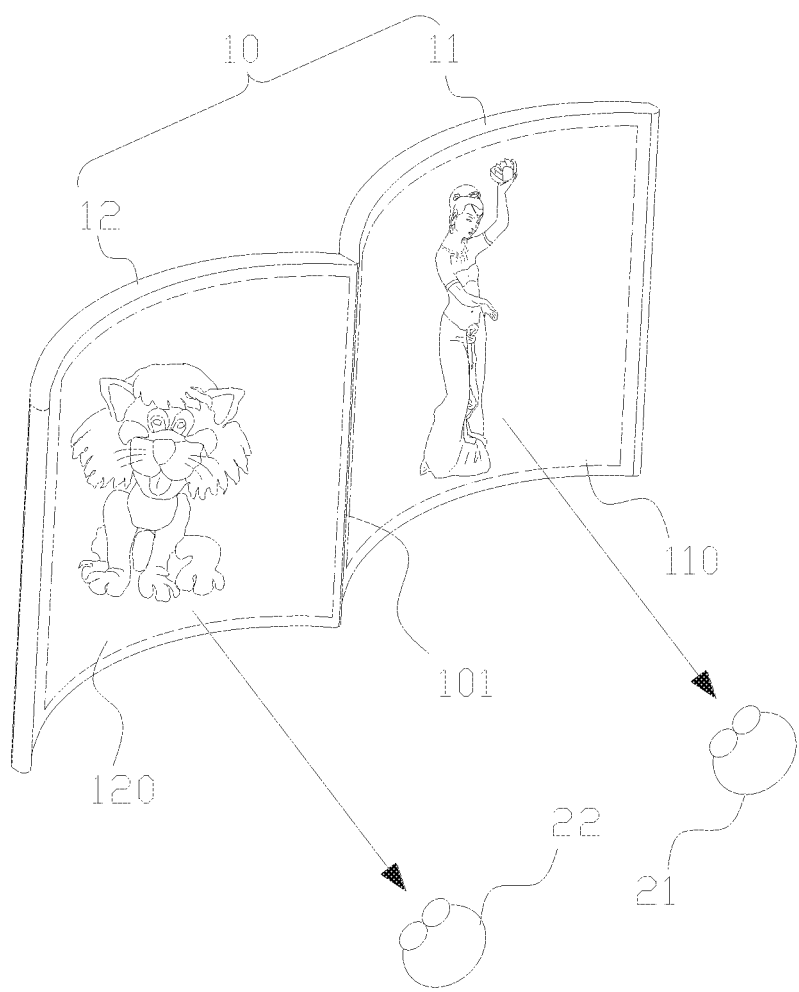
FIG. 6 is a schematic view of an effect of users viewing a curved display screen with a split-screen display method according to an embodiment of the present disclosure.

A specific application scenario of the aforementioned embodiments is shown in FIG. 6. FIG. 6 is a schematic view of an effect of users viewing a curved display screen with a split-screen display method according to an embodiment of the present disclosure. The curved display screen 10 can bent and split into two curved display screens, the first curved display screen 11 and the second curved display screen 12. When a plurality of users want to view programs using the curved display screen 10, the curved display screen 10 can be bent into a first curved display screen 11 and a second curved display screen 12 according to the preset fold line by the external force. When a control unit of the display screen or a host coupled to the display screen detects that the curved display screen 10 is split into the first curved display screen 11 and the second curved display screen 12, the position information of the preset fold line on the curved display screen 10 is obtained, and the display interface of the curved display screen 10 is divided into a first sub-interface 110 and a second sub-interface 120. Then the display content that the users selected to view is respectively selected in the first sub-interface 110 and the second sub-interface 120, and the display content is shown to different users through the first sub-interface 110 and the second sub-interface, respectively, for example, the user 21 and the user 22 can enjoy different display content. Since the physical splitting screen and the software splitting screen are combined, the users can view different display content according to the split-screen display method with the effect of viewing two independent display screens, thereby improving the viewing experience of the users.

Figure 7:
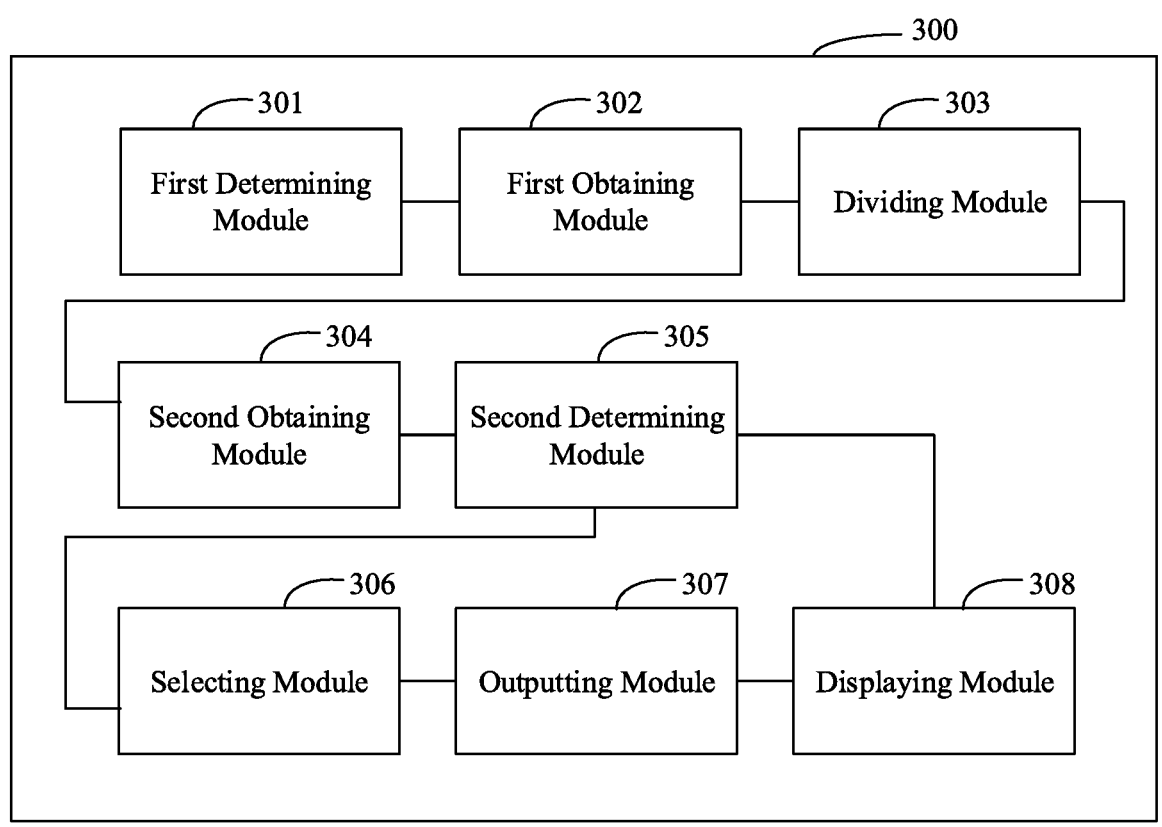
FIG. 7 is a schematic block view of a display apparatus according to an embodiment of the present disclosure.

Referring to FIG. 7, FIG. 7 is a schematic block view of a display apparatus according to an embodiment of the present disclosure. The display apparatus includes a curved display screen, which can be bent into a plurality of curved display screens by an external force. As shown in FIG. 7, the display apparatus 300 includes: a first determining module 301, a first obtaining module 302, a dividing module 303, a second obtaining module 304, a second determining module 305, a selecting module 306, an outputting module 307 and a displaying module 308.

The first determining module 301 is configured to determine whether a split-screen function of the curved display screen is selected when it is detected that the user is bending and splitting the curved display screen and a display screen corresponding to the preset fold line is recessed relative to the rear side of the curved display screen. The split-screen function can corresponds to a mode of split screen button, the split screen button is defined on the curved display screen. After the user bents and splits the curved display screen along the preset fold line, and the display screen corresponding to the preset fold line is recessed relative to the rear side of the curved display screen, the user is prompted to select the split-screen function. For example, the split-screen function of the curved display screen can be selected by pressing the split screen button.

The first obtaining module 302, configured to obtain position information of a preset fold line on curved display screen in response to detecting that a user bends and splits the curved display screen according to the preset fold line, and the preset fold line is a dividing line between adjacent curved display screens formed by the bending and splitting. The first obtaining module is specifically used to obtain corresponding column pixel units of the preset fold line on the curved display screen. Specifically, during obtaining the position information of the preset fold line on the curved display screen, specifically, the preset fold line includes but is not limited to a vertical fold line, and if the fold line is the vertical fold line, then the corresponding column pixel units of the vertical fold line on the curved display screen is obtained. The column pixel units can be used as the position information of the vertical fold line on the curved display screen. Further, the position information of the preset fold line on the curved display screen can also be determined by other manners.

The dividing module 303 is configured to divide a display interface of the curved display screen into a plurality of sub-interfaces according to the position information. A splitting line between the two adjacent sub-interfaces coincides with the preset fold line. Specifically, referring to FIG. 2, the display interface of the curved display screen 10 is divided into the sub-interface of the first curved display screen 11 and the sub-interface of the second curved display screen 12.

The second obtaining module 304 is configured to obtain display content selected by the user in the sub-interfaces. Specifically, if the user 21 selects a video A in the sub-interface of the first curved display screen 11 and the user 22 selects a video B in the sub-interface of the second curved display screen 12, then the display content selected by the users is obtained, i.e., the video A and the video B.

The second determining module 305 is configured to determine whether audio information exists in the display content. The existing method of audio information detection is employed. If the audio information exists in the display content, then selecting module 306 is called. If no audio information exists in the display content, then displaying module 308 is called.

The selecting module 306 is configured to select an audio channel from a plurality of audio channels used by the curved display screen in response to determining that the audio information exists in the display content. The curved display screen uses a plurality of audio channels, and the audio channels are independent audio channels, which can transmit different audio information separately and simultaneously, and the different audio channels correspond to different audio devices, such as earphone interfaces and speakers.

The outputting module 307 is configured to output the audio information through the selected audio channel. Specifically, the selected audio channel is an audio channel selected for a different split screen. The audio information of the selected display content in the split screen is output through the audio channel corresponding to the split screen, therefore different display content can be viewed through different sub-interfaces of the curved display screen, and the users can only listen to the audio information of the respective display content, thereby preventing each other from interfering with each other, and improving the visual and aural experience during viewing.

The displaying module 308 is configured to display the display content selected in the sub-interfaces via the sub-interfaces. For example, the user 21 selects the video A in the sub-interface of the first curved display screen 11, then the video A is displayed via the sub-interface of the first curved display screen 11. The user 22 selects the video B in the sub-interface of the second curved display screen 12, then the video B is displayed via the sub-interface of the second curved display screen 12.

In the display apparatus of the aforementioned embodiments according to present disclosure, the curved display screen is physically bent by the user along the preset fold line, and by a software the curved display screen is divided into a plurality of sub-interfaces according to a display interface splitting manner corresponding to the physical bending manner, such that different sub-interfaces display different content, thereby enabling multiple users to simultaneously view different screen content.

It may be clearly understood by a person skilled in the art that, for the purpose of convenient and brief description, for a detailed working process of the foregoing system, apparatus, and unit, reference may be made to a corresponding process in the method embodiments, and details are not described herein again.

The steps in the method of the embodiments according to the present disclosure can be adjusted, combined and deleted according to actual needs.

The units or modules in the terminal of the embodiment according to the present disclosure may be combined, divided and deleted according to actual needs.

The above embodiments are adopted to only describe rather than limit the technical solutions of the disclosure. Although detailed descriptions about the disclosure have been made with reference to preferred embodiments, it should be understood that those skilled in the art may make modifications or equivalent replacements to the technical solutions of the disclosure without departing from the purpose and scope of the technical solutions, which shall fall within the scope of the claims of the disclosure.

Although the description is illustrated and described herein with reference to certain embodiments, the description is not intended to be limited to the details shown. Modifications may be made in the details within the scope and range equivalents of the claims.

What is claimed is:

1. A split-screen display method, applicable to a display apparatus comprising a curved display screen, comprising:
   determining whether a split-screen function of the curved display screen is selected;
   obtaining position information of a preset fold line on the curved display screen in response to determining that the split-screen function of the curved display screen is selected and in response to detecting that a user performs an act of bending and splitting the curved display screen according to the preset fold line, wherein a display screen corresponding to the preset fold line is recessed relative to a rear side of the curved display screen, wherein the act of bending and splitting includes bending the curved display screen into at least two curved display screens according to the preset fold line, and wherein the preset fold line is a dividing line between the at least two curved display screens formed by the bending and splitting;
   dividing a display interface of the curved display screen into independent sub-interfaces according to the position information, wherein a splitting line between the sub-interfaces coincides with the preset fold line;
   obtaining display content selected by the user in the sub-interfaces; and
   displaying the display content selected in the sub-interfaces via the sub-interfaces.

2. The method according to claim 1, further comprising:
   after the step of obtaining the display content selected by the user in the sub-interfaces, determining whether audio information exists in the display content;
   selecting an audio channel used by the curved display screen in response to determining that the audio information exists in the display content; and
   outputting the audio information through the selected audio channel.

3. The method according to claim 1, wherein the preset fold line is a vertical fold line, and
   wherein the step of obtaining the position information of the preset fold line on the curved display screen includes obtaining corresponding column pixel units of the vertical fold line on the curved display screen.

4. The method according to claim 1, wherein the step of obtaining the position information of the preset fold line on the curved display screen includes obtaining corresponding column pixel units of the preset fold line on the curved display screen.

5. The method according to claim 2, wherein the preset fold line is a vertical fold line, and
wherein the step of obtaining the position information of the preset fold line on the curved display screen includes obtaining corresponding column pixel units of the vertical fold line on the curved display screen.

6. The method according to claim 2, wherein the step of obtaining the position information of the preset fold line on the curved display screen includes obtaining corresponding column pixel units of the preset fold line on the curved display screen.

7. A split-screen display method, applicable to a display apparatus including a curved display screen having a display interface, the method comprising:
obtaining position information of a preset fold line on the curved display screen in response to detecting when a user performs an act of bending and splitting the curved display screen according to the preset fold line, wherein a display screen corresponding to the preset fold line is recessed relative to a rear side of the curved display screen, wherein the act of bending and splitting includes bending the curved display screen into at least two curved display screens according to the preset fold line, and wherein the preset fold line is a dividing line disposed between the at least two curved display screens formed by the act of bending and splitting;
dividing the display interface into independent sub-interfaces according to position information, wherein a splitting line disposed between the sub-interfaces coincides with the preset fold line;
obtaining display content selected by the user in the sub-interfaces; and
displaying the display content selected in the sub-interfaces via the sub-interfaces.

8. The method according to claim 7, further comprising:
prior to the step of obtaining the position information of the preset fold line on the curved display screen, determining whether a split-screen function of the curved display screen is selected; and
obtaining position information of the preset fold on the curved display screen in response to determining that the split-screen function of the curved display screen is selected.

9. The method according to claim 7, further comprises:
after the step of obtaining the display content selected by the user in the sub-interfaces, determining whether audio information exists in the display content;
selecting an audio channel used by the curved display screen in response to determining that the audio information exists in the display content; and
outputting the audio information through the selected audio channel.

10. The method according to claim 8, wherein the preset fold line is a vertical fold line and
wherein the step of obtaining the position information of the preset fold line on the curved display screen includes obtaining corresponding column pixel units of the vertical fold line on the curved display screen.

11. The method according to claim 8, wherein the step of obtaining the position information of the preset fold line on the curved display screen includes obtaining corresponding column pixel units of the preset fold line on the curved display screen.

12. The method according to claim 9, wherein the preset fold line is a vertical fold line, and
wherein the step of obtaining the position information of the preset fold line on the curved display screen includes obtaining corresponding column pixel units of the vertical fold line on the curved display screen.

13. The method according to claim 9, wherein the step of obtaining the position information of the preset fold line on the curved display screen includes obtaining corresponding column pixel units of the preset fold line on the curved display screen.

14. A display apparatus that includes a curved display screen, the apparatus comprising:
a first obtaining module adapted to obtain position information of a preset fold line on the curved display screen in response to detecting when a user performs an act of bending and splitting the curved display screen according to the preset fold line, wherein a display screen corresponding to the preset fold line is recessed relative to a rear side of the curved display screen, wherein the act of bending and splitting includes bending the curved display screen into at least two curved display screens according to the preset fold line, and wherein the preset fold line is a dividing line disposed between the at least two curved display screens formed by the bending and splitting;
a dividing module adapted to divide a display interface of the curved display screen into independent sub-interfaces according to the position information, wherein a splitting line disposed between the sub-interfaces coincides with the preset fold line;
a second obtaining module adapted to obtain display content selected by the user in the sub-interfaces; and
a displaying module adapted to display the display content selected in the sub-interfaces via the sub-interfaces.

15. The apparatus according to claim 14, further comprising a first determining module adapted to determine whether a split-screen function of the curved display screen is selected, and
wherein the first obtaining module is adapted to obtain position information of the preset fold on the curved display screen in response to determining that the split-screen function of the curved display screen is selected.

16. The apparatus according to claim 14, further comprising:
a second determining module adapted to determine whether audio information exists in the display content;
a selecting module adapted to select an audio channel used by the curved display screen in response to determining that the audio information exists in the display content; and
an outputting module adapted to output the audio information through the selected audio channel.

17. The apparatus according to claim 15, wherein the preset fold line is a vertical fold line, and
wherein the first obtaining module is adapted to obtain corresponding column pixel units of the vertical fold line on the curved display screen.

18. The apparatus according to claim 15, wherein the first obtaining module is adapted to obtain corresponding column pixel units of the preset fold line on the curved display screen.

19. The apparatus according to claim 16, wherein the preset fold line is a vertical fold line, and wherein the first obtaining module is adapted to obtain corresponding column pixel units of the vertical fold line on the curved display screen.

20. The apparatus according to claim 16, wherein the first obtaining module is adapted to obtain corresponding column pixel units of the preset fold line on the curved display screen.

\* \* \* \* \*